United States Patent [19]

Chen

[11] Patent Number: 5,386,763
[45] Date of Patent: Feb. 7, 1995

[54] AUTOMATIC BAKING MACHINE WITH PREHEATING CAPABILITY AND METHOD FOR CONTROLLING OPERATION THEREOF

[76] Inventor: Shang-Hsien Chen, No. 27, Sec. 3, Chung-Shan Rd., Tan-Tzu Hsiang, Taichung Hsien, Taiwan, Prov. of China

[21] Appl. No.: 186,960

[22] Filed: Jan. 27, 1994

[51] Int. Cl.$^6$ .............................................. A47J 27/00
[52] U.S. Cl. ....................................... 99/327; 99/331; 99/339; 99/348; 99/357; 99/453; 99/455; 99/468; 426/504
[58] Field of Search ................. 99/331, 332, 333, 348, 99/352, 468, 327, 329 R, 339, 467, 453, 357, 455; 426/504, 512

[56] References Cited

U.S. PATENT DOCUMENTS 4,903,587  2/1990  Nagasaka et al. ..................... 99/468
5,054,383  10/1991  Cho ........................................ 99/468
5,076,153  12/1991  Takahashi et al. .................... 99/332

Primary Examiner—David A. Scherbel
Assistant Examiner—Reginald L. Alexander
Attorney, Agent, or Firm—Lowe, Price, LeBlanc & Becker

[57] ABSTRACT

An automatic baking machine includes a hollow housing, a container disposed in the housing for containing dough therein, a temperature sensing unit disposed in the housing for detecting an initial container temperature of the container when the automatic baking machine is activated, a heating device operable so as to heat the container, and a programmable microcomputer control unit connected to the temperature sensing unit and the heating device for controlling the heating device to preheat the container up to a preheating temperature corresponding to the initial container temperature for a predetermined time period when the initial container temperature detected by the temperature sensing unit is lower than a predetermined temperature.

4 Claims, 7 Drawing Sheets

|  | PRIMARY KNEADING | PRIMARY KNEADING RISING | SECONDARY KNEADING | SECONDARY RISING | GAS RELEASE | FINAL RISING | BAKING | COOLING DOWN |
|---|---|---|---|---|---|---|---|---|
| TEMP. | 25℃ | 28℃ | 25℃ | 32℃ |  | 32℃ | 200℃ |  |
| TIME (MINUTE) | 15 | 60 | 18 | 20 | 0.3 | 70 | 40 | 50 |
| HEATING DEVICE |  | ■ |  | ■ |  | ■ | ■ |  |

223 MINS (3 HOURS 43 MINS)

FIG.1
PRIOR ART

| | PRIMARY KNEADING | PRIMARY RISING | SECONDARY KNEADING | SECONDARY RISING | GAS RELEASE | FINAL RISING | BAKING | COOLING DOWN |
|---|---|---|---|---|---|---|---|---|
| TEMP. | 25℃ | 32℃ | 25℃ | 35℃ | | 35℃ | 200℃ | |
| TIME (MINUTUE) | 10 | 5 | 15 | 20 | 0.3 | 50 | 40 | 50 |
| HEATING DEVICE | | ■ | | ■ | | ■ | ■ | |

140 MINS (2 HOURS 20 MINS)

FIG.2
PRIOR ART

| | PREHEAT | PRIMARY KNEADING | PRIMARY RISING | SECONDARY KNEADING | SECONDARY RISING | GAS RELEASE | FINAL RISING | BAKING | COOLING DOWN |
|---|---|---|---|---|---|---|---|---|---|
| TEMP. | REFER TO FIG.5 | 25℃ | 32℃ | 25℃ | 35℃ | | 35℃ | 200℃ | |
| TIME (MINUTE) | | 15 | 10 | 5 | 20 | 0.3 | 50 | 40 | 50 |
| HEATING DEVICE | ■ | | ■ | | ■ | | ■ | ■ | |

155 MINS (2 HOURS 35 MINS)

FIG.4

| INITIAL CONTAINER TEMPERATURE | PREHEATING TEMPERATURE |
|---|---|
| 20 ℃ ↑ | NOT NEED PREHEAT |
| 19 ℃ | 21 ℃ |
| 18 ℃ | 21.5 ℃ |
| 17 ℃ | 22 ℃ |
| 16 ℃ | 22.5 ℃ |
| 15 ℃ | 23 ℃ |
| 14 ℃ | 23.5 ℃ |
| 13 ℃ | 24 ℃ |
| 12 ℃ | 24.5 ℃ |
| 11 ℃ ↓ | 25 ℃ |

FIG.5

AUTOMATIC BAKING MACHINE WITH PREHEATING CAPABILITY AND METHOD FOR CONTROLLING OPERATION THEREOF

BACKGROUND OF THE INVENTION

1. Field Of The Invention

This invention relates to a baking machine, more particularly to an automatic baking machine with a preheating capability and a method for controlling the operation thereof.

2. Description Of The Related Art

Presently, a conventional automatic baking machine is controlled to perform a series of baking procedures by a programmable microcomputer control unit which is incorporated therein.

FIG. 1 shows a standard time program of the conventional automatic baking machine (not shown). Initially, dough (not shown) in a container (not shown) of a baking oven (not shown) of the automatic baking machine undergoes a primary kneading procedure at 25° C. for approximately 15 minutes. The dough then undergoes a primary rising procedure at 28° C. for approximately 60 minutes with the activation of a heating device (not shown) of the baking machine. After the primary rising procedure, the dough undergoes a secondary kneading procedure at 25° C. for approximately 18 minutes, the heating device being deactivated at this time. Then, the heating device is again activated to enable the dough to undergo a secondary rising procedure at 32° C. for approximately 20 minutes. A gas release procedure for approximately 0.3 minute is performed after the execution of the secondary rising procedure. Following the gas release procedure, the dough undergoes a final rising procedure at 32° C. for approximately 70 minutes. Then, the heating device remains activated to bake the dough at 200° C. for 40 minutes. Finally, a cooling down procedure is performed for approximately 50 minutes, thus completing the baking operation. Excluding the time for performing the cooling down procedure, the total time for performing the above described procedures is approximately 3 hours and 43 minutes.

Referring now to FIG. 2, a table similar to that illustrated in FIG. 1 is shown. From the table shown in FIG. 2, it can be seen that the time for performing each of the baking procedures is generally less than that for performing each of the baking procedures shown in FIG. 1 when the conventional automatic baking machine is controlled by the conventional programmable microcomputer control unit to perform a shortened time program. Excluding the time for performing the cooling down procedure, the total time for performing the different baking procedures is approximately 2 hours and 20 minutes. This total time is shorter than that of the standard time program.

To ensure the production of high-quality products, it is well known in the art that the dough should be maintained at a rising temperature between 20° C. to 24° C., which is approximately equal to the normal room temperature. However, during winter, the room temperature is usually below 20° C. so that the quality of the products of the conventional automatic baking machine cannot be ensured regardless of whether the automatic baking machine is controlled to perform the standard time program or the shortened time program. To overcome the aforementioned problem, the conventional automatic baking machine is generally equipped with means for providing hot water into the container. When the room temperature is lower than 20° C., the heating device is activated to heat the water stored in the housing (not shown) of the automatic baking machine and the hot water is conveyed automatically into the container to increase the temperature in the container. However, it is too expensive to equip a conventional automatic baking machine with such a hot water providing means.

Referring once more to FIGS. 1 and 2, the times of each of the baking procedures shown in FIG. 2 are generally less than those of the baking procedures shown in FIG. 1, and the rising temperatures for the different rising procedures shown in FIG. 2 are generally higher than those for the rising procedures shown in FIG. 1, thereby resulting in the production of poor-quality products caused by early or insufficient fermentation.

SUMMARY OF THE INVENTION

Therefore, the main object of the present invention is to provide an automatic baking machine with a preheating capability and a method for controlling the operation of the baking machine to ensure that the dough will rise at an appropriate temperature while keeping the times for the different baking procedures at a minimum.

According to this invention, an automatic baking machine includes a hollow housing, a container disposed in the housing for containing dough therein, a temperature sensing unit disposed in the housing for detecting an initial container temperature of the container when the automatic baking machine is activated, a heating device operable so as to heat the container, and a programmable microcomputer control unit connected to the temperature sensing unit and the heating device for controlling the heating device to preheat the container up to a preheating temperature corresponding to the initial container temperature for a predetermined time period when the initial container temperature detected by the temperature sensing unit is lower than a predetermined temperature.

In another aspect of the present invention, a method for controlling the operation of an automatic baking machine, which baking machine includes a hollow housing, a container disposed in the housing for containing dough therein, a temperature sensing unit disposed in the housing for detecting an initial container temperature of the container when the automatic baking machine is activated, and a heating device operable so as to heat the container, includes the step of controlling the heating device to preheat the container up to a preheating temperature corresponding to the initial container temperature for a predetermined time period when the initial temperature detected by the temperature sensing unit is lower than a predetermined temperature.

BRIEF DESCRIPTION OF THE DRAWINGS

Other features and advantages of the present invention will become apparent in the following detailed description of the preferred embodiment, with reference to the accompanying drawings, of which:

FIG. 1 is a table showing a standard time program of a conventional automatic baking machine;

FIG. 2 is a table showing a shortened time program of a conventional automatic baking machine;

FIG. 4 is a table showing an improved shortened time program of the automatic baking machine according to the present invention;

FIG. 5 is a table illustrating the relationship between the initial container temperature and the preheating temperature;

DETAILED DESCRIPTION OF THE PREFERRED EMBODIMENT

Figure 3:
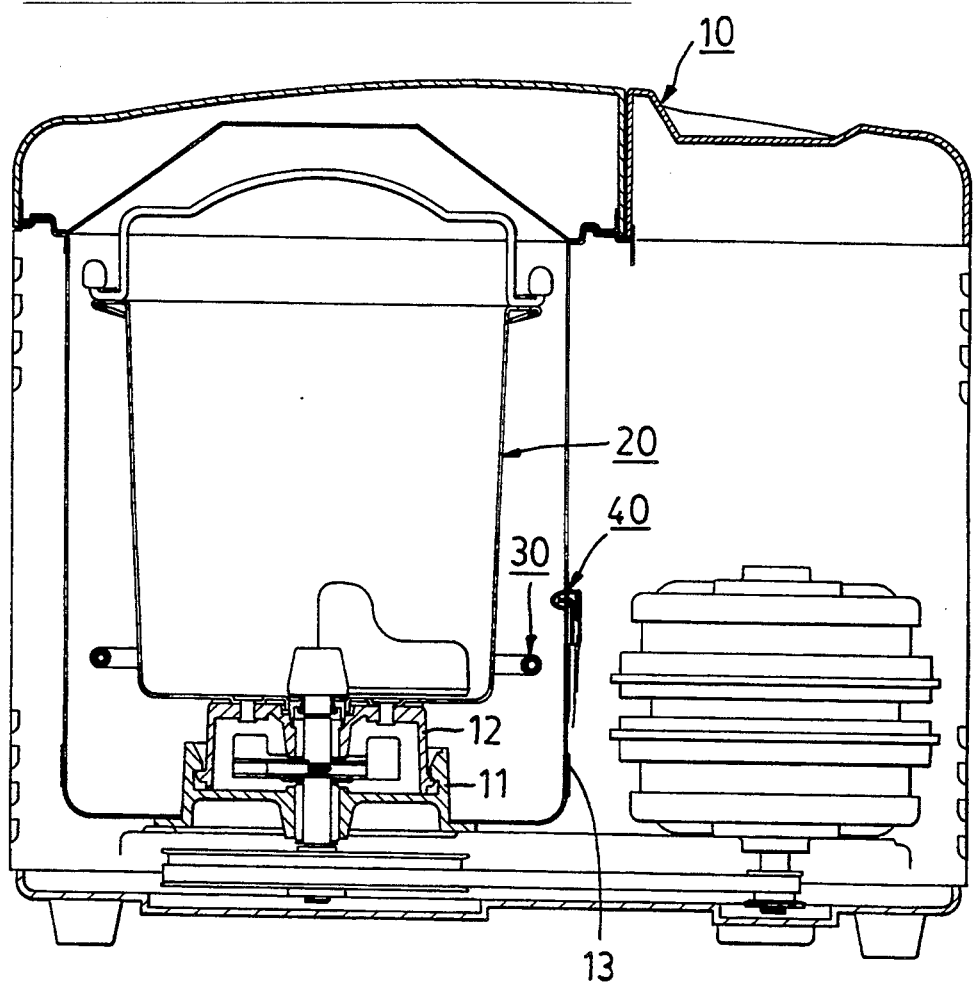
FIG. 3 is a partly sectional view showing an automatic baking machine according to the present invention.

Referring to FIG. 3, an automatic baking machine according to the present invention includes a hollow housing 10 in which an oven 13 is disposed. A base member 11 is provided in the housing 10 adjacent to a bottom surface of the housing 10 and extends into the oven 13. The base member 11 has a positioning member 12 mounted thereon. A container 20 is mounted on the positioning member 12 by means of rivets. An annular heating device 30 is provided in the oven 13 and is adjacent to the lower end of the container 20. On an inner wall portion of the oven 13, a temperature sensing unit 40 is installed. The temperature sensing unit 40 and the heating device 30 are connected to a programmable microcomputer control unit 50 (see FIG. 6) which is provided in the housing 10.

Referring now to FIG. 4, the total elapsed time for performing the primary kneading, primary rising, secondary kneading, secondary rising, gas release, final rising and baking procedures in accordance with the improved shortened time program performed by the automatic baking machine of the present invention is equal to that shown in FIG. 2. However, an additional preheating procedure is performed for 15 minutes before the execution of the primary kneading procedure upon detection by the temperature sensing unit 40 that an initial container temperature of the container 20 is lower than a predetermined temperature. This procedure will be described in greater detail in the succeeding paragraphs.

Figure 6:
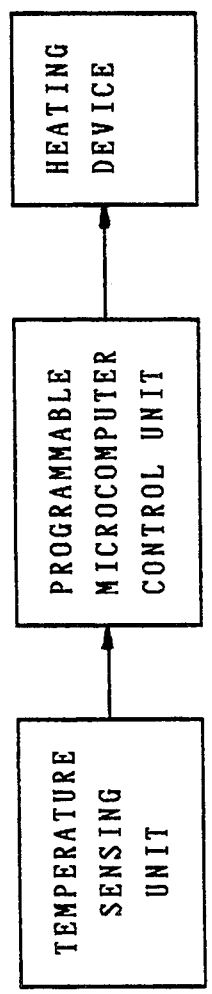
FIG. 6 is a schematic block diagram showing the connection among a temperature sensing unit, a programmable microcomputer control unit and a heating device of the automatic baking machine according to the present invention.
Figure 7:
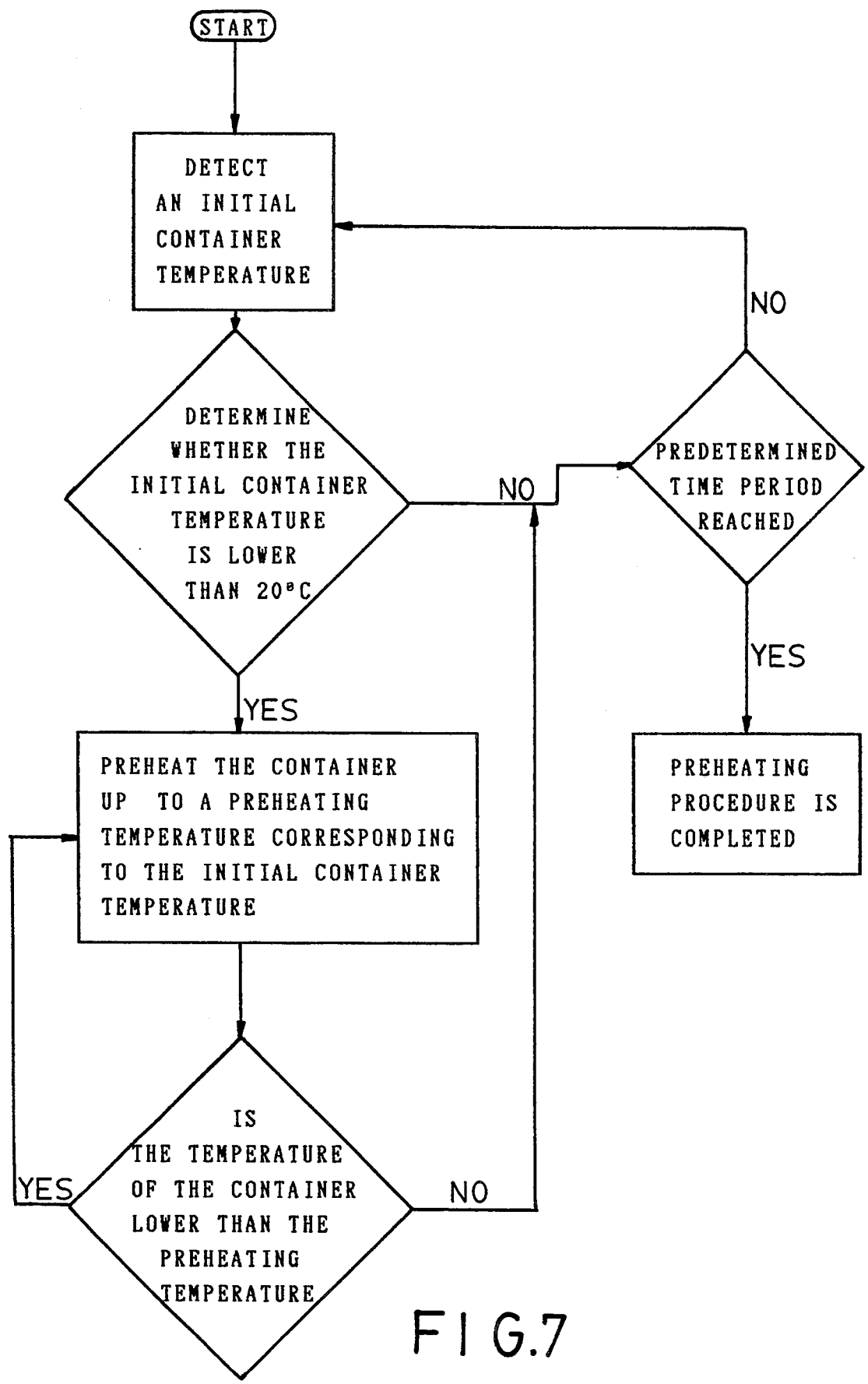
FIG. 7 is a flow chart illustrating a preheating operation performed by the automatic baking machine according to the present invention.

Referring to FIGS. 4, 6 and 7, during operation, after the dough (not shown) is placed in the container 20 and the automatic baking machine is activated, the temperature sensing unit 40 detects the initial container temperature of the container 20. If the initial container temperature is lower than a predetermined temperature, such as 20° C., the control unit 50 controls the heating device 30 to preheat the container 20 up to a preheating temperature corresponding to the initial container temperature for a predetermined time period. Referring to FIG. 5, the preheating temperature is inversely proportional to the initial container temperature. That is to say, when the initial container temperature detected by the temperature sensing unit 40 is 17° C, the preheating temperature is 22° C. If the initial container temperature is 13° C., the preheating temperature is 24° C. Thus, if a lower initial container temperature is detected, a higher preheating temperature is required, and vice versa. From the table shown in FIG. 5, it can be seen that the heating device 30 is not activated to preheat the container 20 when the initial container temperature is greater than or equal to 20° C. It can also be seen that the lower limit of the initial container temperature is 11° C., which is normally the minimum room temperature for places with thermostats. In the present embodiment, the predetermined time period is approximately 15 minutes. That is to say, supposing that the initial container temperature detected by the temperature sensing unit 40 is 15° C., the heating device 30 is thus activated to preheat the container 20 up to 23° C. When the temperature of the container 20 reaches 23° C., the heating device 30 is deactivated while a timer unit (not shown) of the control unit 50 is activated. When the temperature of the container 20 becomes lower than 23° C., the heating device 30 is activated again to maintain the temperature of the container 20 at 23° C. The additional preheating procedure is continued until the total time recorded in the timer unit is equivalent to 15 minutes, and the automatic baking machine is controlled to perform the next baking procedure, that is, the primary kneading procedure.

In this embodiment, when the initial container temperature detected by the temperature sensing unit 40 is greater than or equal to 20° C., an additional wait procedure is performed. However, the heating device 30 is not activated during this procedure. Similarly, the automatic baking machine is controlled to perform the primary kneading procedure after the total time recorded in the timer unit is equivalent to 15 minutes. Because of the inclusion of the additional preheating or wait procedure, the different ingredients are allotted more time to react, thereby reducing the rising time required to produce high-quality products.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. An automatic baking machine including a hollow housing, a container disposed in said housing for containing dough therein, a temperature sensing unit disposed in said housing for detecting temperature of said container, said temperature sensing unit detecting an initial container temperature of said container when said automatic baking machine is activated, and a heating device operable so as to heat said container, wherein the improvement comprises: means, connected to said temperature sensing unit and said heating device, for controlling said heating device to preheat said container up to a preheating temperature corresponding to said initial container temperature for a predetermined time period when said initial container temperature detected by said temperature sensing unit is lower than a predetermined temperature, wherein said preheating temperature is inversely proportional to said initial container temperature.

2. An automatic baking machine as claimed in claim 1, wherein said predetermined temperature is approximately 20° C.

3. A method for controlling the operation of an automatic baking machine said baking machine including a hollow housing, a container disposed in said housing for containing dough therein, a temperature sensing unit disposed in said housing for detecting temperature of said container, said temperature sensing unit detecting an initial container temperature of said container when said automatic baking machine is activated, and a heating device operable so as to heat said container, said method comprising the step of:

controlling said hearing device to preheat said container up to a preheating temperature corresponding to said initial container temperature for a predetermined time period when said initial temperature detected by said temperature sensing unit is lower than a predetermined temperature, wherein said preheating temperature is inversely proportional to said initial container temperature.

4. A method for controlling the operation of an automatic baking machine as claimed in claim 3, wherein said predetermined temperature is approximately 20° C.

* * * * *